UNITED STATES PATENT OFFICE.

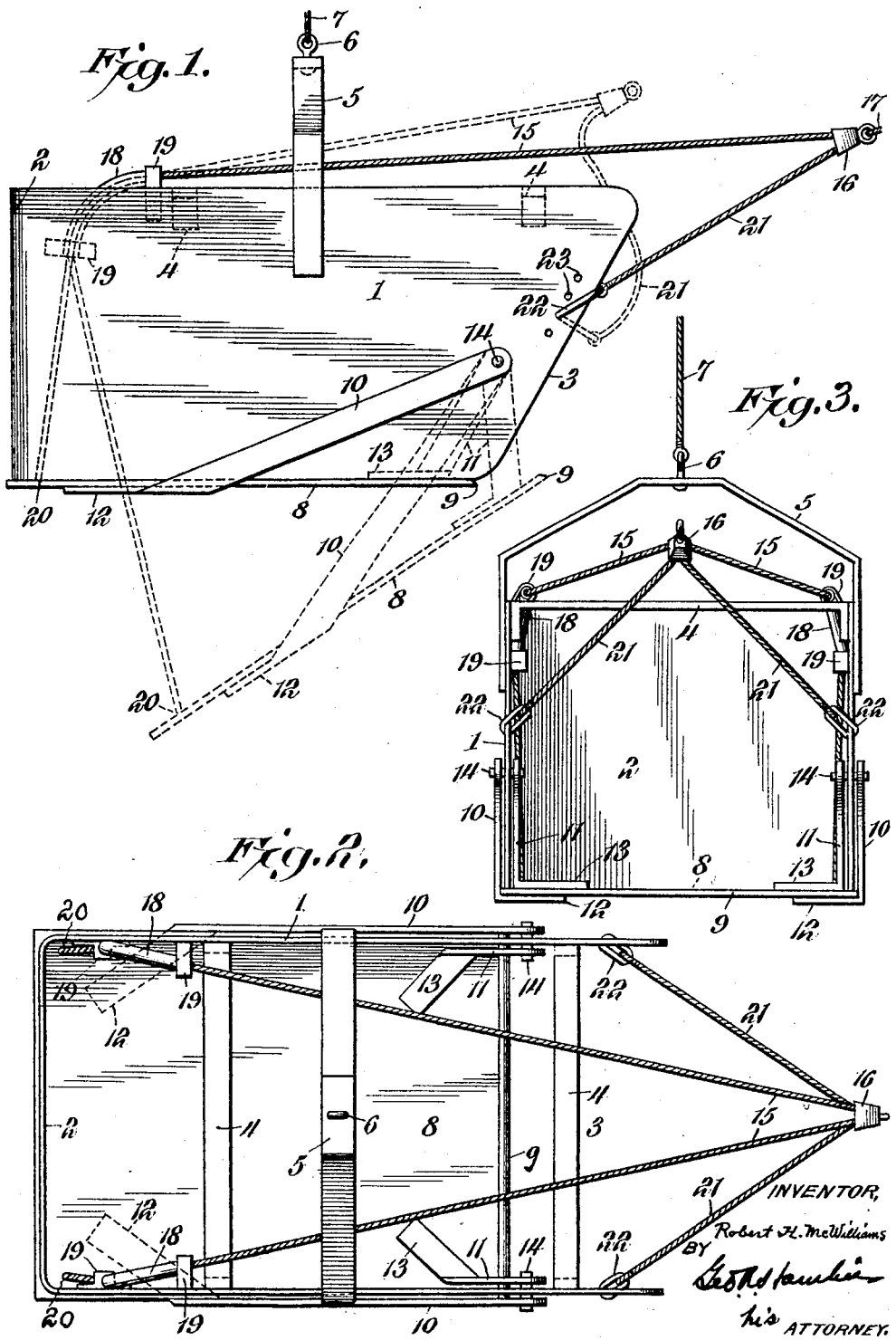

ROBERT H. McWILLIAMS, OF MEMPHIS, TENNESSEE.

EXCAVATING-SHOVEL.

1,325,027.   Specification of Letters Patent.   Patented Dec. 16, 1919.

Application filed December 3, 1918. Serial No. 265,148.

*To all whom it may concern:*

Be it known that I, ROBERT H. MCWILLIAMS, a citizen of the United States, residing at Memphis, in the county of Shelby and State of Tennessee, have invented certain new and useful Improvements in Excavating-Shovels, of which the following is a specification.

This invention relates to excavating shovels, such as are raised or lowered by one cable and pulled or drawn by another cable for purposes of filling and, particularly, to those excavating shovels which are provided with a hinged section which is adapted to be opened for the purpose of dumping the load.

My object is to provide an improved excavating shovel of the character aforesaid which will have a dump bottom hinged and guided in an improved manner whereby it will be prevented from swaying and getting out of line with the shovel from constant opening and closing, thereby remedying a defect incident to excavating shovels of the general class described.

The foregoing object is accomplished by providing a movable or dump bottom which has hinge members, one mounted to swing inside the shovel and against the wall thereof, and the other to swing outside the shovel and against its wall and, preferably, arranged at different angles. The construction described is provided at both sides of the shovel and the dump bottom is thereby mounted for a bodily opening and closing movement, during which the hinge members prevent any lateral displacement of the bottom.

A further object of the invention is to provide an improved arrangement of pulling cables and connections for the shovel and for holding the dump bottom closed or, when slackened, permitting it to open, together with improved guiding means for the cables, as will appear more fully hereinafter.

The shovel can be adjusted so that its pitch may be changed for digging either hard or soft material. To that end, the pulling connection is arranged to be connected to the shovel at different points to vary the pitch or angle which the bottom of the shovel will make with the material being excavated.

The present invention requires no extra cable for the accomplishment of dumping of the shovel. The load can be dumped into a wagon or any place of limited area, by letting the filled shovel down, with both cables taut, then releasing the pulling cable and hoisting the shovel, as will appear more fully hereinafter.

In the accompanying drawings,

Figure 1 is a side elevation, dotted lines representing the shovel bottom in open position and the pulling cables slack;

Fig. 2, a plan view, and

Fig. 3, a front elevation.

The shovel has side walls 1 and an end wall 2 which are permanently closed; the shovel is open at its front 3. Braces 4 connect the upper portions of the side walls 1 to prevent them from springing or buckling. A bail 5 is connected to the side walls and is provided with an eye bolt 6 to which the hoisting cable 7 is suitably fastened. The hoisting cable 7 is used in the usual manner for raising or lowering the shovel from a derrick or any other suitable hoisting means.

My improved dump bottom 8 is mounted so that it will be adapted to move bodily in opening and closing. The bottom 8 is provided with a cutting edge 9 at its forward portion which extends across the open end of the shovel, at the bottom thereof.

Heretofore difficulty has been experienced with dump bottoms or sections of excavating shovels due to the fact that they tend to become displaced laterally and get out of line with the open portion of the shovel which they are intended to close. To obviate this trouble I provide an improved mounting or hinge connection for the bottom 8. This comprises a pair of hinge members 10 and 11, of strap metal, respectively provided with feet 12 and 13 riveted to the lower and upper faces of the bottom 8. The hinge connection 10 extends from the rearward part of the bottom 8 to the pivot bolt or rivet 14 which is disposed about midway of the height of the side 1, near the front edge thereof. The other hinge member 11 is connected to the front portion of the bottom 8 and is located on the inside of the shovel and, also, pivoted on the bolt or rivet 14. The hinge members 10 and 11, being disposed on opposite sides of the side wall 1 and swinging in contact therewith, or substantially so, serve as guides and limiting devices which prevent any lateral displacement of the bottom 8. The construction described is provided at both sides of the shovel, there being two of the hinge members 10, correspondingly formed and located, and two of the hinge members 11, correspondingly formed and located. Supporting the bottom 8 from both its rearward and forward portions, insures against buckling. The members 10 and 11 serve, therefore, not only as hangers or hinges for the bottom 8 but, also, as braces for it.

To lower or close the dump bottom 8, there is provided a pair of cables 15 leading from a coupling 16 to which the pull rope or cable 17 is fastened. The cables 15 diverge from the coupling 16 and pass downwardly through curved tubular guides 18 secured by clips 19 to the upper rear portions of the sides 1. The cables are fastened to the rear portion of the bottom 8 near the opposite edges thereof at the points designated 20.

In substitution for the curved guides 18 and clips 19, I may provide inclosed pulleys or sheaves.

To the coupling 16 are connected the pulling cables or chains 21 which diverge therefrom and have links, hooks, or other detachable fastenings 22 adapted to be received in any one of the series of holes 23 in the sides 1 of the shovel. By changing the position of the links or hooks or other devices 22 from one set of holes to another set, the pitch or angle the shovel will assume when digging into the earth, may be varied and provision made for digging either hard or soft material. If desired the walls 1 may be closer together at the mouth end 3 than at the rear end 2 of the shovel so that any material which enters the mouth end will be sure to pass out through the rear bottom portion of the shovel when the bottom 8 is opened.

The cable 17 may be pulled by any suitable power means to cause the knife edge 9 to dig into the material to be excavated. After the shovel is filled, it can be hoisted or lowered away to the place where it is to be dumped, by keeping both of the cables 7 and 17 taut, until the exact point of dumping is reached, whereupon the cable 7 may be hoisted and the cable 17 paid out. When this is done the slackening of the cables 15 and 21 will allow the bottom 8 to swing on its pivots 14 to dump the load which will then slide easily off the said bottom 8.

What I claim is:

1. An excavating shovel having a dump bottom, and hinge members connecting said bottom to the walls of said shovel, said hinge members being arranged in pairs at opposite sides of the shovel, the members of the respective pairs being located on opposite sides of the shovel wall for the purpose of preventing lateral displacement of the bottom.

2. An excavating shovel having a dump bottom, and hinge members connected to the dump bottom at different points of its length and arranged in pairs at the respective sides of the shovel, the members of each pair of hinge members being located on opposite sides of the wall of the shovel and thereby adapted to prevent lateral displacement of the dump bottom and also to serve as braces for said dump bottom.

3. An excavating shovel having a bodily movable dump bottom, hinge members arranged in pairs at the respective sides of the shovel, one member of each pair being connected to the rear portion of the dump bottom, the other member of each pair being connected to the front portion of the dump bottom, the members of each pair being concentrically pivoted to a wall of the shovel and located on opposite sides of the said wall and substantially in contact therewith, whereby the dump bottom is prevented from having lateral movement and from buckling.

4. An excavating shovel provided with a hinged dump bottom, in combination with combined pulling and dumping means directly connected to the shovel itself and also operatively connected to the dump bottom, and independent hoisting means for the shovel, said dump bottom being operated solely by the action of the pulling means aforesaid without interfering with the pulling of the shovel.

5. An excavating shovel provided with a hinged dump bottom, in combination with combined pulling and dumping means for the shovel comprising two sets of flexible connections, respectively operatively connected to the dump bottom and also directly connected to the shovel itself in an adjustable manner whereby the pitch of the shovel may be changed at will, and independent hoisting means for said shovel, said dump bottom being operated solely by the action of the pulling means aforesaid.

6. An excavating shovel provided with a hinged dump bottom, cable guides carried by the side walls of the shovel, converging pulling cables connected to the dump bottom and running over said cable guides, other pulling connections attached to the shovel itself which are joined to the converging cables aforesaid, and independent hoisting means for the shovel, said dump bottom being operated solely by the action of the pulling cables.

In testimony whereof I affix my signature.

ROBERT H. McWILLIAMS.